United States Patent [19]
> Mead et al.

[11] Patent Number: 4,476,159

[45] Date of Patent: Oct. 9, 1984

[54] HIGH TEMPERATURE ADHESIVE SILICONE FOAM COMPOSITION, FOAM GENERATING SYSTEM AND METHOD OF GENERATING FOAM

[75] Inventors: Judith W. Mead, Peralta; Orelio J. Montoya, Albuquerque; Peter B. Rand, Albuquerque; Vernon O. Willan, Albuquerque, all of N. Mex.

[73] Assignee: The United States of America as represented by the United States Department of Energy, Washington, D.C.

[21] Appl. No.: 564,103

[22] Filed: Dec. 21, 1983

[51] Int. Cl.³ ............................................... C08J 9/30
[52] U.S. Cl. ...................................... 427/136; 521/78; 521/79; 521/131; 521/154; 521/910
[58] Field of Search ................... 521/78, 79, 154, 131, 521/910; 427/136

[56] References Cited

U.S. PATENT DOCUMENTS

| | | | |
|---|---|---|---|
| 3,912,665 | 10/1975 | Spitzer et al. | 521/78 |
| 4,202,279 | 5/1980 | Rand | 521/913 |
| 4,229,548 | 10/1980 | Sattlegger et al. | 521/917 |
| 4,328,319 | 5/1982 | Osipow et al. | 521/79 |
| 4,422,877 | 12/1983 | Spitzer et al. | 521/78 |

*Primary Examiner*—Morton Foelak
*Attorney, Agent, or Firm*—Armand McMillan; Albert Sopp; Michael F. Esposito

[57] ABSTRACT

Access to a space is impeded by generation of a sticky foam from a silicone polymer and a low boiling solvent such as a halogenated hydrocarbon. In a preferred aspect, the formulation is polydimethylsiloxane gel mixed with F502 Freon as a solvent and blowing agent, and pressurized with $CO_2$ in a vessel to about 250 PSI, whereby when the vessel is opened, a sticky and solvent resistant foam is deployed. The foam is deployable, over a wide range of temperatures, adhering to wet surfaces as well as dry, is stable over long periods of time and does not propagate flame or lose adhesive properties during an externally supported burn.

21 Claims, No Drawings

HIGH TEMPERATURE ADHESIVE SILICONE FOAM COMPOSITION, FOAM GENERATING SYSTEM AND METHOD OF GENERATING FOAM

The U.S. Government has rights in this invention pursuant to Contract No. DE-AC04-76DP00789 between the U.S. Department of Energy and Western Electric Company.

BACKGROUND OF THE INVENTION

This invention relates to an adhesive foam composition which is safely stored, easily deployed, but very difficult to remove and thus, useful in access denial situations. The invention also relates to the foam system employed for generating the foam, and to the method of generating such a foam composition for denying access in access denial situations.

One prior art method of generating an adhesive foam is discussed in U.S. Pat. No. 4,202,279 wherein a sticky foam is generated from a tacky polymeric resin and a low boiling solvent. Typically, a thermoplastic resin comprising a blend of styrene/butadiene copolymer and polyindene, a styrene-isoprene thermoplastic elastomer, a polyterpene, an elastomeric resin, and a polyisobutylene resin is employed. The low boiling solvent serves to dissolve the resin and to provide a gas for blowing the foam. Furthermore, a nucleating agent is employed to promote the formation of fine celled foam. The foam is generated by preblending the resin and additives, and placing it in a pressurized container, and the foam is generated upon opening or rupturing of the container and releasing the contents to atmospheric pressure.

It is also known from the prior art that silicone is difficult to remove and resistant to breakdown and/or removal with common solvents and thus, it is desirable to employ a silicone based system in a use or access denial situation. However, prior silicone systems are not stable, generally require a catalyst and typically set to a rigid foam material.

U.S. Pat. No. 4,229,548 to Sattletger, et al. discloses such an organopolysiloxane foam employed as a molding or joint sealer. In a preferred formulation, polydimethylsiloxane is employed packaged under pressure with a cross-linking agent whereby when mixed and discharged, a molding composition is produced. It is noted, as discussed above, that this system is not stable over a wide temperature range, and in addition, requires a catalyst.

Other known foams of this type generally provide that the mixing of the components has to occur just prior to use. Thus, it is typically very complicated to generate such silicone adhesive foams.

SUMMARY OF THE INVENTION

It is thus an object of the invention to provide a composition for producing an adhesive silicone foam which is stable over a long period of time, is not easily removed with conventional solvents, and does not propagate flame or lose adhesive properties during an externally supported burn.

It is another object of the invention to provide a system for generating a silicone adhesive foam of the above-described nature which has a good expansion ratio and is easily dispersed in a variety of deployment systems to deny access to a region, both under dry as well as wet conditions.

It is still another object of the invention to provide such a system for generating a foam which is deployable and effective during a wide range of environmental temperatures.

Yet still another object of the invention is to provide a method of use of such a foam wherein such foams can be deployed in an access denial role in situations such as airport runways or safeguard systems.

Still another object is to provide a foam system which provides deployment from a single component system, without requiring mixing of various materials just prior to use.

Upon further study of the specification and appended claims, further objects and advantages of this invention will become apparent to those skilled in the art.

In one aspect the invention is a silicone composition for preparing an adhesive foam consisting essentially of polydimethylsiloxane gel mixed with F502 Freon. F502 Freon is defined in the literature as being a blend of 48.8% by weight $CHClF_2$ and 51.2% by weight of $CClF_2$-$CF_3$. Alternatively, the composition is dimethysilicone fluid mixed with F12 Freon. F12 Freon is defined in the literature as being dichlorodifluoromethane. The selected mixture is mixed under pressure with a nucleating agent in a container, and in amounts effective to generate a foam when pressure is released to atmosphere and the mixture dispersed. Typically, the nucleating agent is $CO_2$ and the pressure under which it is mixed is about 250 PSI.

In another aspect, the invention relates to a method of preparing an adhesive silicone foam system comprising mixing polydimethylsiloxane with F502 Freon, in amounts wherein the polydimethylsiloxane is effective as a polymeric backbone and the F502 Freon is effective as a solvent and blowing agent. The mixture is introduced into a vessel and pressurized in the vessel with the nucleating agent to a pressure sufficient whereby when released and depressurized to atmospheric pressure, sufficient nucleating sites for producing the foam are provided. In a most preferred aspect, the amounts mixed are about 60% by weight polydimethylsiloxane and about 40% by weight F502 Freon and this mixture is then pressurized with $CO_2$ in a vessel to about 250 PSI. In yet still another aspect, the invention comprises a method of preparing an adhesive silicone foam system by mixing dimethylsilicone fluid and F12 Freon in the manner discussed above with respect to polydimethylsiloxane and F502 Freon. The invention also relates to methods of generating a stable adhesive foam. Included is the method of denying access to an airport runway by deploying the foam on such a surface.

DETAILED DISCUSSION

The invention relates to an adhesive foam which can be effectively used to aid in the neutralization of e.g., airfields, and any other area to which access is to be denied. For instance, by employing such a foam on an airfield, a series of barricades could be established which would preclude enemy ground/flight operations for a satisfactory period of time. The foam system of the invention provides a foam barricade in sufficient quantity and substantial enough in its physical properties to restrict, e.g., aircraft crossing. The foam when generated possesses a tenacious quality such that removal is difficult, time-consuming, and possibly physically hazardous since the foam cannot be attacked by conventional solvent attack with such common solvents as JP4, gasoline, alcohol, toluene or MEK.

The invention relates essentially to two preferred formulations employed to generate the foam. The most preferred formulation is a silicone system employing a cross-linked gel, i.e., polydimethylsiloxane as a polymeric backbone starting material. F502 Freon, (which as previously discussed, consists of a blend of $CHClF_2$ in an 48.8% by weight with $CClF_2-CF_3$ in an amount of 51.2% by weight), is used as a solvent/blowing agent to generate a foam which is employable over a wide range of use temperatures. Of course the amounts of $CHClF_2$ and $CClF_2-CF_3$ in the F502 Freon can vary within normal tolerances as employed in commercial blends. Likewise, other halogenated hydrocarbons of the same type and having similar properties can be employed as will be evident to those of ordinary skill in the art.

Alternatively, a foam system of dimethylsilicone fluid with F12 Freon, (F12 Freon being dichlorodifluoromethane) can also be employed to provide a foam having similar properties. As with F502 Freon, substances having similar property can be employed as a substitute for F12 Freon. The low boiling solvent, i.e., F502 Freon and F12 Freon, serve both to dissolve the silicone polymer and to provide a gas for blowing the foam.

In addition to the above, a nucleating agent is added to the mixture to pressurize it in a pressurized container. Thus, when the container is opened and pressure is released to atmosphere, the foam is generated. Typically, a preferred nucleating agent is $CO_2$ added in amounts sufficient to pressurize a vessel containing the above-discussed mixtures to a level sufficient such that when the mixture is released from the vessel and depressurized to atmospheric pressure, the foam is generated. Typically, it has been found that pressurizing the container containing the silicone polymer and solvent to about 250 PSI provides good results with respect to generation of the foam.

When the mixture is released, for example, by rupturing a sealed pressurized container, a foam is produced which has high surface adhesion even with respect to wet surfaces. For instance, adhesion to a dry surface such as concrete is instantaneous, and is not limited to concrete but can include a variety of materials such as wood, metal, etc. Likewise, when dispersed on a wet concrete substrate, initial adhesion is within about 1 to 2 minutes, and the adhesion continues for a long time, e.g., several hours thereafter. The burn characteristics of the foam thus generated are such that it will not propagate flame or lose adhesive properties during an externally supported burn. It is resistant to solvent attack, and especially resistant to breakdown and/or reoval by common solvents such as JP4, gasoline, alcohol, toluene or methyl ethyl ketone. The foam thus generated is also deployable and effective during a wide range of environmental temperature conditions, typically those found in weapons applications which range, i.e., about 31 50° C.-+80° C.

In a preferred aspect, the mixture when pressurized with $CO_2$ under optimum proportions as will be discussed hereinafter, and pressurized to about 250 PSI has very good foamability, i.e., a high foam expansion ratio. Typically, at least a 15:1 or better expansion ratio is acheved to provide a stable foam for a satisfactory period of time, e.g., several hours. The foam system is such that it can be dispersed in a variety of deployment systems, and can be provided as a one-component system which when dispersed generates optionally a tenacious camouflage or mask for a number of possible devices which could be added to the foam, such as explosive munitions, locating beacons, various tire puncturing prongs and other access impeding devices.

As noted previously, a silicone system employing polydimethysiloxane gel as a polymeric backbone can be employed with F502 Freon used as a solvent/blowing agent which provides a wide range of used temperatures. The carbon dioxide is used to pressurize the material in, for example, metal containers. In a preferred aspect, the formulation consists of polydimethylsiloxane, available under the trade name Gel-2 from McGhan-Nu Sil Inc., in an amount of 80–40% by weight, more preferably 50–70% by weight, and most preferably about 60% by weight. The gel is characterized as being generally of high molecular weight, e.g., above about 500,000, although it is difficult to classify precisely because it is a cross-linked gel. Other polydimethylsiloxane gels having properties similar to said Gel-2 can be employed. More specifically, the polydimethylsiloxane must be a gel and be lightly cross-linked. The term "lightly cross-linked" is a term conventionally employed and the meaning well known to those of ordinary skill in the art. The F502 Freon is provided in an amount of about 20–60%, more preferably 50–30% by weight, and most preferably 40% by weight. The mixture is then pressurized in the container with $CO_2$ to about 200 PSI. Although $CO_2$ is preferred as the nucleating agent, other nucleating agents as well known to those of ordinary skill in the art can be employed. When released, the density of this formulation in the most preferred formulation, in the foam state, is about 4.5 pounds per cubic foot.

When polydimethysiloxane and F502 Freon are employed as the silicone foam system, the F502 Freon serves a dual function. First, the F502 Freon serves as a solvent to achieve the desired velocity, and secondly, it provides a blowing agent for the foam when depressurized to atmospheric pressure. The $CO_2$ as noted previously serves as a nucleating agent for the foam.

The mixing procedure for preparing the silicone foam system is to add the silicone resin to a pressure mixing vessel. The F502 Freon is then added using evaporative cooling, in a conventional manner, to allow liquid transfer. The vessel is then sealed and mixed until the mixture is substantially homogeneous, and then $CO_2$ is added until pressurized to typically about 250 PSI. As noted previously, a pressure of 250 PSI is not a fixed value, and only sufficient nucleating agent need be added and depressurization to atmosphere conducted to permit sufficient foaming of the mixture when released.

The silicone foam system can be deployed in a variety of ways. One method of deployment is by rupturing a containment vessel in a controlled manner to provide rapid dispersement. Such a rupturing can be done, for example, with a vessel such as a fire extinguisher like vessel having a longitudinally exploding charge. The charge can then be exploded and rapid dispersement provided. Alternatively, the foam can be manifolded to the target area to provide a controlled dispersion, such as for example, through a trip valve. This system does not require a pump because of the pressure of the Freon solvent therein. Still another modification includes providing the foam in containers which rupture easily when force is exerted thereon, such as a glass container. Although these methods of deployment have been discussed, it is not intended that other methods obvious to those of ordinary skill in the art are to be precluded.

An alternative formulation for the silicone foam is to provide dimethylsilicone fluid in an amount of about 20–60% by weight, preferably 50% by weight with F12 Freon in an amount of 80–40% by weight, preferably 50% by weight. The mixing procedure and deployment for this formulation is similar to that in the case of the polydimethylsiloxane based foam. The dimethylsilicone fluid is also of high molecular weight, typically used 500,000.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A one gallon aluminum container, shaped as a fire extinguishing elongate vessel, was filled with a foam composition of 60% by weight polydimethylsiloxane, 40% by weight F502 Freon, and pressurized to 250 PSI with $CO_2$. A linear shaped charge was exploded to cut through the metal to longitudinally open the vessel and the foam was dispersed on a concrete surface. Instant and continual adhesion over several hours was provided. The foam thus generated did not propagate flame or lose adhesive properties during an externally supported burn. There was a resistance to solvent attack, both polar and non-polar as well as to acids and bases. The solvents JP4, gasoline, alcohol, toluene and Mek were employed. The foam had an expansion ratio in all instances of at least about 15:1 and was dispersed rapidly by this method.

EXAMPLE 2

A foam system as in example 1 was dispersed on a wet surface of concrete. Adhesion occurred within about 1 to 2 minutes of initial laydown and the foam continued to adhere to the surface. The results of this test were otherwise the same as in example 1.

EXAMPLE 3

The same formulation as in example 1 was filled into a pressurized container having a trip valve, which container measured about 18 inches in length and 3 inches in diameter. The container was pressurized to 250 PSI with $CO_2$. The foam was generated by releasing the trip valve and the results were similar to those of example 1.

EXAMPLE 4

The foam system of example 1 was filled into a one liter glass container and pressurized therein to 250 PSI with $CO_2$. The glass container was shattered and a foam similar to that of example 1 was generated. The results were similar to those of example 1.

The preceding examples can be repeated with similar success by substituting the generically or specifically described reactants and/or operating conditions of this invention for those used in the preceding examples.

Although the foam system of the invention is especially adapted for use in runway interdiction operations, it is also possible to use such a foam system in such applications as safeguard applications where denial to an enclosed areas such as a room is desired. This foam is especially desirable for such use because of its wide temperature range deployment characteristics.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A silicone composition for preparing an adhesive foam consisting essentially of: (1) polydimethylsiloxane gel mixed with a blend of 48.8% by weight of $CHClF_2$ and 51.2% by weight of $CClF_2\text{-}CF_3$ or (2) dimethylsilicone fluid mixed with dichlorodifluoromethane, in amounts effective to generate an adhesive foam.

2. A silicone composition as in claim 1 consisting essentially of 80–40% by weight of polydimethylsiloxane gel mixed with 20–60% by weight of a blend of 48.8% by weight of $CHClF_2$ and 51.2% by weight of $CClF_2\text{-}CF_3$.

3. A silicone composition as in claim 1 consisting essentially of 80–40% by weight dimethylsilicone fluid mixed with 20–60% by weight dichlorodifluoromethane.

4. A silicone composition as in claim 2 consisting essentially of 50–70% by weight polydimethylsiloxane gel and 50–30% by weight of a blend of 48.8% by weight of $CHClF_2$ and 51.2% by weight of $CClF_2\text{-}CF_3$.

5. A silicone composition as in claim 4 consisting essentially of about 60% by weight dimethylsiloxane gel and about 40% by weight of a blend of 48.8% by weight of $CHClF_2$ and 51.2% by weight of $CClF_2\text{-}CF_3$.

6. A silicone composition as in claim 2 further comprising a nucleating agent mixed with said composition in a pressurized vessel under a pressure effective to generate the foam when released to atmosphere from said vessel.

7. A silicone composition as in claim 6 wherein the nucleating agent is $CO_2$ and the composition is pressurized in said vessel to a pressure of about 250 PSI.

8. A method of preparing an adhesive silicone foam system consisting essentially of: mixing polydimethylsiloxane gel with a blend of 48.8% by weight of $CHClF_2$ and 51.2% by weight of $CClF_2\text{-}CF_3$ in amounts wherein said polydimethylsiloxane is effective as a polymeric backbone and said F502 Freon is effective as a solvent and blowing agent; introducing said mixture into a vessel and pressurizing said vessel with a nucleating agent to a pressure sufficient whereby when released to at least atmospheric pressure, sufficient nucleating sites for producing the foam are provided.

9. A method as in claim 8 further comprising mixing about 80–40% by weight polydimethylsiloxane gel with about 20–60% by weight of a blend of 48.8% by weight of $CHClF_2$ and 51.2% by weight of $CClF_2\text{-}CF_3$, and said pressurization step comprising pressurizing with $CO_2$ to a pressure of about 250 PSI.

10. A method as in claim 9 wherein the amounts mixed are about 50–70% by weight polydimethylsiloxane gel and about 50–30% by weight of a blend of 48.8% by weight of $CHClF_2$ and 51.2% by weight of $CClF_2\text{-}CF_3$.

11. A method as in claim 10 wherein the amounts mixed are about 60% by weight polydimethylsiloxane gel and about 40% by weight of a blend of 48.8% by weight of $CHClF_2$ and 51.2% by weight of $CClF_2\text{-}CF_3$.

12. A method of preparing an adhesive silicone foam system comprising: mixing about 40–60% by weight dimethylsilicone fluid with about 60–40% by weight dichlorodifluoromethane; introducing said mixture into a vessel; and pressurizing said vessel with a nucleating agent to a pressure sufficient whereby when released to atmospheric pressure, sufficient nucleating sites for producing the foam are provided.

13. A method of generating a stable adhesive foam with the system of claim 8 comprising control rupturing the vessel to cause said mixture to be discharged to generate said foam.

14. A method of generating a stable adhesive foam as in claim 13 wherein said vessel is an elongate vessel, and said control rupturing is effected by exploding a linear shaped charge in a manner such as to cut through the metal to cause rapid dispersion of the foam.

15. A method of generating a stable adhesive foam as in claim 13 wherein said vessel is an elongate metal vessel having a rapid release valve, and the control rupturing is effected by tripping said rapid release valve.

16. A method of generating a stable adhesive foam as in claim 13 wherein said vessel is of a structure such that when slight pressure is exerted from the outside on the walls said vessel in the pressurized condition, said vessel ruptures, and the controlled opening is thus effected by so rupturing said vessel.

17. A method of generating a stable adhesive foam as in claim 13 wherein said generating of said foam is effected on a airport runway to deny access thereto.

18. A method of generating a stable adhesive foam as in claim 13 wherein said generating of said foam is effected in a room to which access is to be denied.

19. A method of generating a stable adhesive foam as in claim 17 wherein said generating of said foam is effected on a wet airport runway.

20. A method of generating a stable adhesive foam as in claim 13 wherein said generating of said foam is effected under temperature conditions of about $-50°$ C. to $+80°$ C.

21. A method of generating an adhesive silicone system as in claim 13 wherein the components of the mixture have been provided in amounts sufficient to generate a foam having a foamability expansion ratio of at least about 15:1.

* * * * *